US006942204B2

United States Patent
(12) United States Patent
Wolf et al.

(10) Patent No.: US 6,942,204 B2
(45) Date of Patent: Sep. 13, 2005

(54) EXTENSION SPRING STRUT

(75) Inventors: Herbert Wolf, Altdorf (DE); Reinhold Breinl, Freystadt (DE)

(73) Assignee: Suspa Holding GmbH, Altdorf (DE)

( * ) Notice: Subject to any disclaimer, the term of this patent is extended or adjusted under 35 U.S.C. 154(b) by 0 days.

(21) Appl. No.: 10/635,905

(22) Filed: Aug. 7, 2003

(65) Prior Publication Data

US 2004/0104522 A1 Jun. 3, 2004

(30) Foreign Application Priority Data

Aug. 7, 2002 (DE) ........................................ 102 36 137

(51) Int. Cl.[7] ......................... F16F 13/00; B62D 25/12; E05F 5/08; E05F 5/10; E05C 17/32

(52) U.S. Cl. ........................ 267/221; 92/85 B; 188/284

(58) Field of Search .......................... 267/221, 34, 124, 267/120, 226, 150, 218, 69–74, 177, 175, 64.18, 64.22, 286, 166, 169, 170, 178, 64.11, 64.25; 188/284, 285, 277; 280/124.179, 124.162, 124.146; 92/85 ALL; 296/76; 213/223; 16/51–52, DIG. 36

(56) References Cited

U.S. PATENT DOCUMENTS

| | | | | |
|---|---|---|---|---|
| 2,844,368 A | | 7/1958 | Butterfield | |
| 3,041,060 A | * | 6/1962 | Jacobsen | 267/177 |
| 3,211,444 A | * | 10/1965 | Avner | 267/226 |
| 3,365,188 A | * | 1/1968 | Rumsey | 267/128 |
| 3,831,919 A | * | 8/1974 | Nicholls | 267/34 |
| 3,917,244 A | * | 11/1975 | Peddinghaus | 267/34 |
| 4,004,662 A | * | 1/1977 | Sorgatz et al. | 188/284 |
| 4,303,231 A | * | 12/1981 | Reuschenbach et al. | 267/64.15 |
| 4,307,874 A | * | 12/1981 | Reuschenbach et al. | 267/64.15 |
| 4,408,751 A | * | 10/1983 | Dodson et al. | 267/120 |
| 4,623,132 A | * | 11/1986 | Smith | 267/34 |
| 4,700,611 A | * | 10/1987 | Kaneko | 91/405 |
| 4,744,444 A | * | 5/1988 | Gillingham | 188/315 |
| 4,776,440 A | * | 10/1988 | Yamada et al. | 188/284 |
| 4,817,898 A | * | 4/1989 | Locher | 248/161 |
| 4,909,488 A | * | 3/1990 | Seibert et al. | 267/64.11 |
| 5,170,530 A | * | 12/1992 | Kopec et al. | 16/52 |
| 5,248,131 A | * | 9/1993 | Jobelius | 267/64.11 |
| 6,024,366 A | * | 2/2000 | Masamura | 280/124.162 |

FOREIGN PATENT DOCUMENTS

| | | | |
|---|---|---|---|
| DE | 164532 | | 11/1905 |
| DE | 24 50 061 | | 4/1976 |
| DE | 3723449 | | 1/1991 |
| DE | 39 39 118 | | 5/1991 |
| DE | 10236137 | * | 2/2004 |

* cited by examiner

*Primary Examiner*—Douglas C. Butler
(74) *Attorney, Agent, or Firm*—Browdy and Neimark, PLLC

(57) ABSTRACT

An extension spring strut comprises a pre-loaded extension spring with a damper disposed therein. An operating element is disposed inside the extension spring, having an actuating tappet that is joined to an end of the extension spring. The actuating tappet is displaceable over a total range of travel that includes a damping range of the piston rod of the damper and a no-load range of the actuating tappet.

17 Claims, 3 Drawing Sheets

19
15
9
13
6
3
10
11
1
5
2
18
14
16
20

EXTENSION SPRING STRUT

BACKGROUND OF THE INVENTION

1. Field of the Invention

The invention relates to an extension spring strut, comprising a pre-loaded extension spring and an integrated damper as employed for example as lifting aids in trunk lids or engine hoods of passenger cars.

2. Background Art

In compression struts of the generic type, the damper simultaneously serves as a guiding and damping unit. The damper in the form of a piston-cylinder unit absorbs the motion of the extension spring over the entire stroke thereof. This may entail drawbacks, in particular when the kinematics of the lid opening and closing motion are such that, when the lid is stopped in an intermediate position, the power of the spring will no longer be sufficient for lifting the lid, the damping effect being too strong.

SUMMARY OF THE INVENTION

It is an object of the invention to embody an extension spring strut of the type mentioned at the outset such that the motion of displacement is damped only in a final stage.

According to the invention, this object is attained by the features of claim 1. The gist of the invention resides in that frictional conditions within the compression strut have been modified as against familiar spring struts, damping taking place only in a final range of stroke of the spring. The remaining range is characterized by nearly frictionless motion of solely the actuating tappet which is then disengaged from the piston rod of the damper.

Further features, advantages and details of the invention will become apparent from the ensuing description of an exemplary embodiment, taken in conjunction with the drawing.

DESCRIPTION OF A PREFERRED EMBODIMENT

Figure 1:
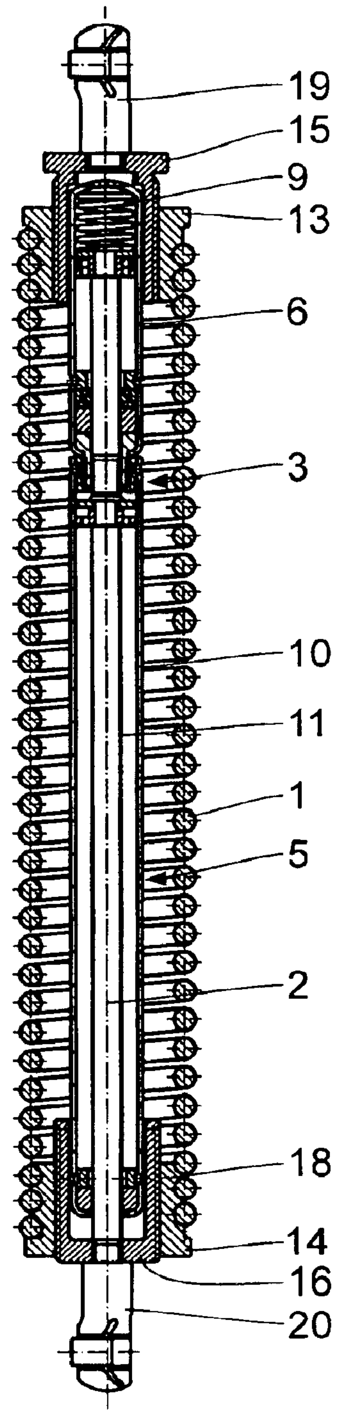
FIG. 1 is a longitudinal sectional view of an extension spring strut according to the invention when contracted.

The extension spring strut seen in the drawing comprises a helical extension spring 1 which inside includes a guiding and damping unit 3 coaxially of its central longitudinal axis 2. This unit 3 comprises a—related to the entire length of the unit 3—short hydraulic damper 4 and an operating element 5.

The damper 4 has a substantially tubular housing 6 with a damping piston 7 disposed and guided therein, a piston rod 8 being mounted on the damping piston 7 and sealingly extended out of the housing 6. The interior space of the housing 6 is filled with a damping fluid. On the side turned away from the piston rod 8, the piston 7 is loaded by a pre-stressed extension spring 9 which loads the piston rod 8 in the direction of extension.

The operating element 5 comprises a guide tube 10, with an actuating tappet 11 being arranged therein coaxially of the axis 2 for axial displacement and guided twice radially of the axis 2. The guide tube 10 is joined to the housing 6 of the damper 4 by means of a threaded joint 12 so that the housing 6 and the guide tube 10, and the tube 10 together with the actuating tappet 11, constitute a deflection-resistant unit.

Threaded bushes are tightly mounted on both ends of the extension spring 1, serving as abutments 13, 14. Holding bushes 15, 16 are screwed into these abutments 13, 14, the threads 17, 18 thereof working in opposite directions i.e., a thread 17 is right-handed while the other thread 18 is left-handed. The free end of the housing 6 supports itself in the holding bush 15. The end of the tappet 11 that projects from the guide tube 10 is fixed in the holding bush 16. Both holding bushes 15, 16 are provided with fastening elements 19, 20 in the form of so-called ball cups. As a result of the design of the abutments, the basic length of travel of the spring system can be set, and thus the pre-load thereof.

Figure 2:
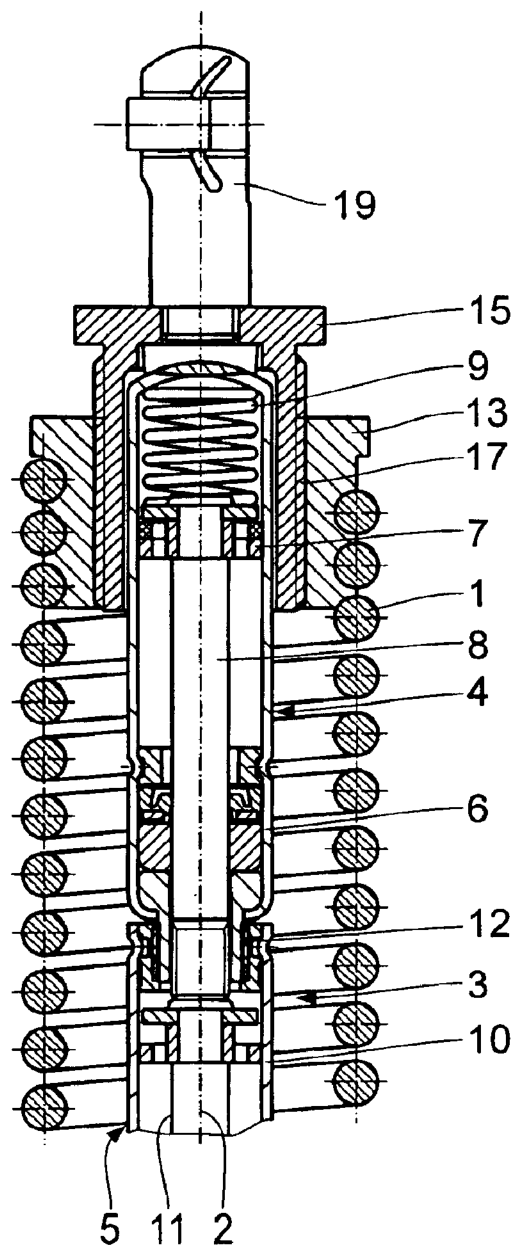
FIG. 2 is an illustration of part of the extension spring strut on an enlarged scale as compared to FIG. 1.

A comparison of FIGS. 1 and 2 on the one hand and 3 on the other shows that elongation of the extension spring strut takes place by opposite tensile forces being applied to the fastening elements 19, 20. The actuating tappet 11 is lifted off the piston rod 8 which is pushed by the extension spring 9 as far as possible out of the housing 6. The actuating tappet 11 is almost frictionlessly extended from the guide tube 10.

Figure 3:
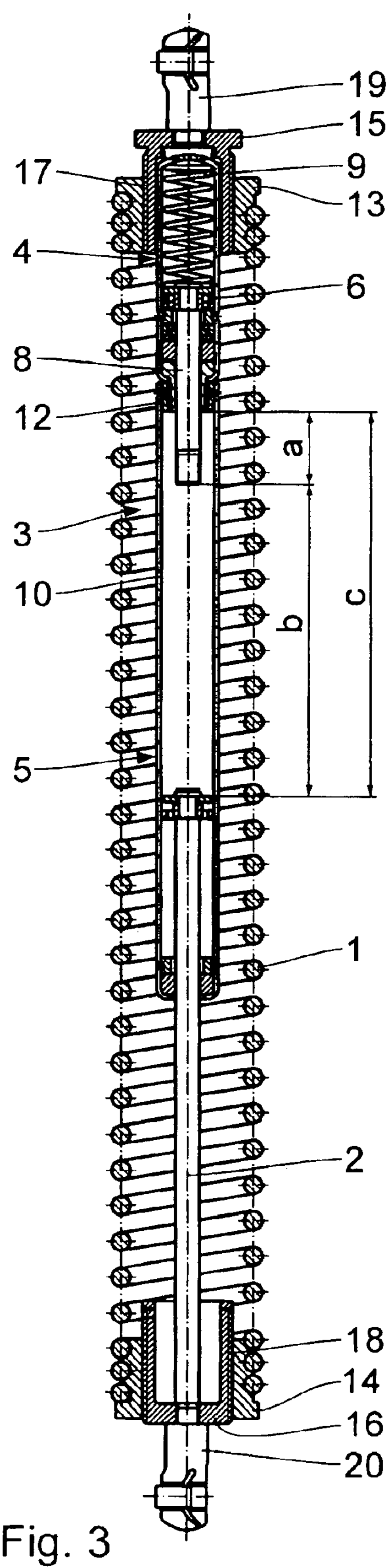
FIG. 3 is a view of the extension spring strut when extended.

When the extension spring 1 is released and contracts, the actuating tappet 11 is pushed into the guide tube 10 nearly free from friction and thus non damped. It will bear against the free end of the piston rod 8 right before termination of linear contraction of the extension spring strut, pushing the piston rod 8 into the housing 6 by corresponding hydraulic damping. This means that only the maximal length of displacement of the piston rod 8 is damped, constituting a damping range a. As opposed to this, the no-load range b given by the distance of the extended piston rod 8 from the extended actuating tappet 11 as seen in FIG. 3 is non damped. As seen in the drawing, b>a applies. Consequently, only a short range is damped of the total range c=a+b.

Figure 5:
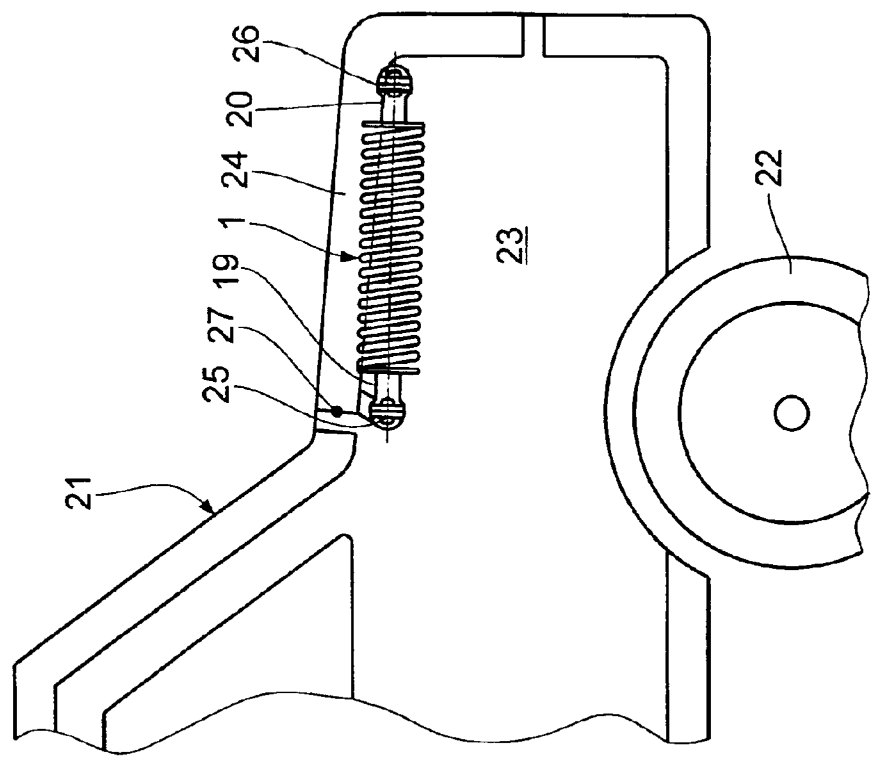
FIG. 5 is a view of the extension spring strut with the trunk lid closed.
Figure 4:
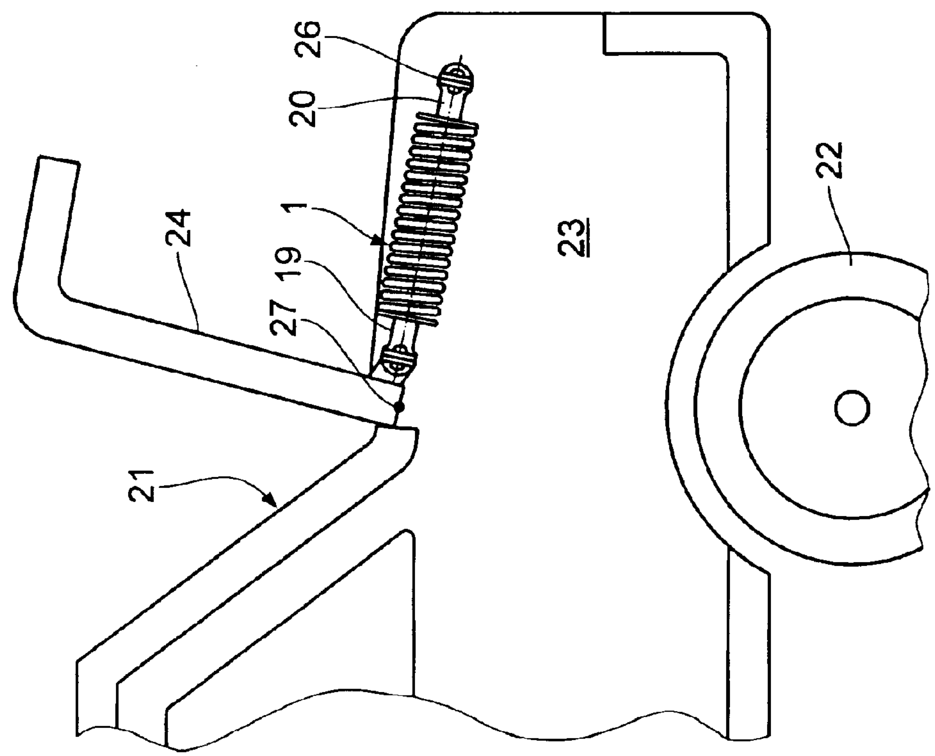
FIG. 4 is an illustration of the extension spring strut employed as a lifting aid for a trunk lid which is illustrated when opened.

FIGS. 4 and S diagrammatically illustrate the use of a extension spring strut according to the invention in a vehicle, only the rear portion of which is illustrated. It includes part of the body 21, the rear wheels 22 and a trunk 23 which is closable by a trunk lid 24. The trunk lid 24 is pivotable about a pivot 25 into an opened position (FIG. 4) and a closed position (FIG. 5).

The compression strut is articulated by its fastening element 20 to an articulation point 26 on the body 21 in the vicinity of the trunk 23, and by its fastening element 19 to an articulation point 27 on the lid 24. The connection is such that the compression strut is being elongated upon closing of the trunk i.e., the extension spring 1 continues to be pre-loaded, whereas opening the lid 24 will lead to linear contraction i.e., release of the extension spring 1, with the compression strut shortening. The distance of the point 27 where the compression strut is articulated to the lid 24, from the point 26 of articulation to the body 21 is reduced upon opening of the lid 24. Lifting the trunk lid 24 is thus supported by the compression strut. As seen from the above description of the compression strut, the actuating tappet 11 will bear against the piston rod 8 of the damper 4 only at the end of the motion of opening the trunk lid 24 so that the motion of opening the lid 24 from the closed position (FIG. 5) is substantially non damped, damping taking place only shortly before the entirely opened position (FIG. 4) is reached.

What is claimed is:

1. An extension spring strut, comprising
a helical extension spring (1) having
a first end, and
a second end; and
a pre-load, which is increased on elongating the spring (1) and is released on linear contraction of the spring (1),
a damper (4),
which is disposed inside the extension spring (1),
which has a housing (6) that is supported on the first end of the extension spring (1) and is filled with a damping fluid, and
which has a damping piston (7) disposed in the housing (6); and
which has a piston rod (8) that is mounted on the damping piston (7) and extended from the housing (6) and movable over a damping range a and directed into the extension spring (1); and
an operating element (5),
which comprises an actuating tappet (11),
which is separated from the piston rod (8),
which is connected with the second end of the extension spring (1), and
which is movable over a total range c that includes a no-load range b of the actuating tappet (11) whereby the actuating tappet (11) is not in contact with the piston rod (8) and that includes the damping range a of the piston rod (8) whereby the actuating tappet (11) is in contact with the piston rod (8).

2. The extension spring strut according to claim 1, wherein b>a applies to the damping range a to no-load range b ratio.

3. The extension spring strut according to claim 1, wherein the actuating tappet (11) is disposed for displaceable guidance in a guide tube (10).

4. The extension spring strut according to claim 3, wherein the guide tube (10) is coaxially joined to the housing (6) of the damper (4).

5. The extension spring strut according to claim 1, wherein the extension spring strut is longitudinally adjustable.

6. The extension spring strut according to claim 1, wherein the damper (4) is a hydraulic damper.

7. An extension spring strut, comprising
a pre-loaded extension spring (1) having
a first end, and
a second end;
a damper (4),
which is disposed inside the extension spring
which has a housing (6) that is supported on the first end of the extension spring (1), and
which has a piston rod (8) that is extended from the housing (6) and movable over a damping range and directed into the extension spring (1); and
an operating element (5),
which comprises an actuating tappet (11),
which is joined to the second end of the extension spring (1), and
which is movable over a total range c that includes a no-load range b of the actuating tappet (11) whereby the actuating tappet (11) is not in contact with the piston rod (8) and that includes the damping range a of the piston rod (8) whereby the actuating tappet (11) is in contact with the piston rod (8),
wherein the extension spring strut is longitudinally adjustable,
wherein a first abutment (13) and a second abutment (14) are mounted on the first end and second end of the extension spring (1), with a first holding bush and a second holding bush (16) being disposed in the first and second abutment (13, 14) for adjustment by threads (17, 18) that work in opposite directions; and
wherein the damper (4) bears against one of the first and second holding bushes (15, 16) and the actuating tappet (11) bears against one of the second and first holding bushes (15, 16).

8. The extension spring strut according to claim 7, wherein b>a applies to the damping range a to no-load range b ratio.

9. The extension spring strut according to claim 7, wherein the actuating tappet (11) is disposed for displaceable guidance in a guide tube (10).

10. The extension spring strut according to claim 9, wherein the guide tube (10) is coaxially joined to the housing (6) of the damper (4).

11. The extension spring strut according to claim 7, wherein the damper (4) is a hydraulic damper.

12. An extension spring strut for use in a vehicle, comprising
a helical extension spring (1) having
a first end, and
a second end;
wherein said extension spring is in a tensioned state between the first end and the second end when said first end and said second end are engaged in said vehicle and said strut is at rest, wherein said extension spring is in linear contraction from said tensioned state when said strut is in operation,
a damper (4),
which is disposed inside the extension spring
which has a housing (6) that is supported on the first end of the extension spring (1) and is filled with a damping fluid, and
which has a damping piston (7) disposed in the housing (6); and
which has a piston rod (8) that is mounted on the damping piston (7) and extended from the housing (6) and movable over a damping range a and directed into the extension spring (1); and
an operating element (5),
which comprises an actuating tappet (11),
which is connected with the second end of the extension spring (1), and
which is movable over a total range c when said extension spring contracts during operation of said strut and that includes the damping range a of the piston rod (8) and a no-load range b of the actuating tappet (11).

13. The extension spring strut according to claim 12, wherein b >a applies to the damping range a to no-load range b ratio.

14. The extension spring strut according to claim 12, wherein the actuating tappet (11) is disposed for displaceable guidance in a guide tube (10).

15. The extension spring strut according to claim 14, wherein the guide tube (10) is coaxially joined to the housing (6) of the damper (4).

16. The extension spring strut according to claim 12, wherein the extension spring strut is longitudinally adjustable.

17. The extension spring strut according to claim 12, wherein the damper (4) is a hydraulic damper.

* * * * *